United States Patent
Meyer et al.

(10) Patent No.: US 6,645,650 B2
(45) Date of Patent: Nov. 11, 2003

(54) PROCEDURE FOR PURGING A FUEL CELL SYSTEM WITH INERT GAS MADE FROM ORGANIC FUEL

(75) Inventors: Alfred P. Meyer, West Simsbury, CT (US); Vincent M. Callaghan, West Granby, CT (US)

(73) Assignee: UTC Fuel Cells, LLC, Windsor, CT (US)

( * ) Notice: Subject to any disclaimer, the term of this patent is extended or adjusted under 35 U.S.C. 154(b) by 29 days.

(21) Appl. No.: 09/975,601

(22) Filed: Oct. 11, 2001

(65) Prior Publication Data

US 2003/0072978 A1 Apr. 17, 2003

(51) Int. Cl.⁷ .................................................. H01M 8/00
(52) U.S. Cl. .......................................... 429/13; 429/17
(58) Field of Search .............................. 429/13, 12, 17, 429/19

(56) References Cited

U.S. PATENT DOCUMENTS

| | | | |
|---|---|---|---|
| 4,115,627 A | 9/1978 | Christner et al. | 429/44 |
| 4,537,839 A * | 8/1985 | Cameron | 429/20 |
| 5,248,567 A | 9/1993 | Amemiya et al. | 429/20 |
| 5,503,944 A | 4/1996 | Meyer et al. | 429/13 |
| 6,024,848 A | 2/2000 | Dufner et al. | 204/252 |
| 6,096,448 A | 8/2000 | Wilkinson et al. | 429/13 |

\* cited by examiner

*Primary Examiner*—Stephen Kalafut
*Assistant Examiner*—R Alejandro

(57) ABSTRACT

A procedure for purging a fuel cell system at start-up or shutdown comprises directing the organic fuel, along with air, into a burner to produce a gas that is essentially inert to the fuel cell, such as a gas of nitrogen, carbon dioxide and water vapor. That inert gas is passed through either or both the fuel cell and fuel processing system components, such as a reformer and shift converter, to purge those components of undesirable gases. In the case of shutdown, after the cell has been disconnected from the primary load, the inert gas produced in the burner is passed either in series or in parallel through the fuel cell and fuel processing system.

11 Claims, 1 Drawing Sheet

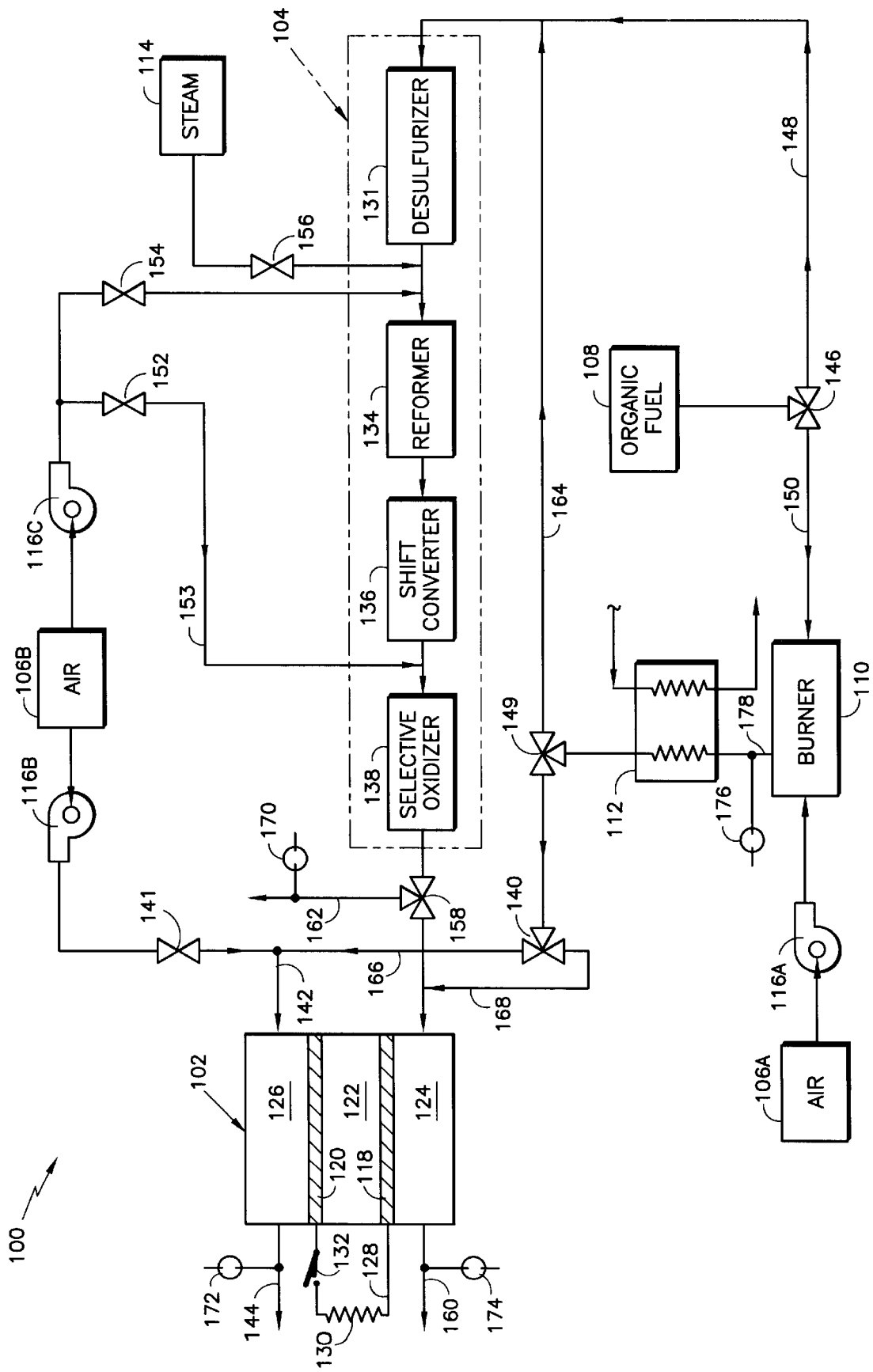

PROCEDURE FOR PURGING A FUEL CELL SYSTEM WITH INERT GAS MADE FROM ORGANIC FUEL

BACKGROUND OF THE INVENTION

1. Technical Field

This invention relates to fuel cell systems, and more particularly to a procedure for shutting down or starting up a fuel cell system.

2. Background Information

Fuel cell systems, including the catalytic components of a fuel processing system for converting organic fuel to hydrogen, and especially the anode side of the fuel cell itself, generally require purging upon shut-down to remove residual hydrogen, and purging upon start-up to remove air. This is necessitated for several reasons, including: The elimination of the potential for flammable mixtures of hydrogen and oxygen; minimizing performance degradation of fuel processing system catalysts and electrode catalysts; and prevention of hazardous material formation during the start-up and shut-down process. Common practice is to purge components with inert gas such as nitrogen or nitrogen mixed with other gases harmless to the component being purged. For example, U.S. Pat. No. 4,537,839 describes using inert gases (defined therein as gases "substantially free of hydrogen"), such as product gases from a catalytic combustor, to purge a fuel cell. U.S. Pat. No. 5,248,567 also describes the use of a fuel cell purge gas from which the combustion elements (mainly oxygen and reactive carbon) have been removed.

In fuel cell power plants it is also known to use a truly inert gas, such as nitrogen, to purge the anode side of the fuel cell and to purge components of fuel processing systems that convert organic fuels, such as gasoline or natural gas, to hydrogen. It is desirable to avoid the need for and cost of having a tank of inert gas, such as nitrogen, as part of the fuel cell system, as well as the need to continually replenish that inert gas.

BRIEF SUMMARY OF THE INVENTION

In the present invention, organic fuel and air is provided to a burner of a fuel cell system to produce an inert gas for purging the fuel cells and/or for purging fuel processing system components, such as a reformer and shift converter. The fuel cell anode flow fields may be purged of air upon start-up prior to providing reactants to the cells. Upon shutdown, the inert gas may be used to purge the cells of reactants and to purge fuel processing system components of residual hydrogen and carbon monoxide. As used in this paragraph and hereinafter, including the appended claims, "inert gas" means not only truly inert gases, such as nitrogen, but a gas that only contains constituents that are not harmful to any fuel cell system components being purged. Preferably, the inert gas contains essentially only nitrogen, water vapor and carbon dioxide.

In one embodiment of the present invention, a fuel cell system that includes a reformer for converting an organic fuel to hydrogen is shut-down by disconnecting the fuel cell from its load, halting the conversion of organic fuel to hydrogen, directing the organic fuel and air into a burner to produce an inert gas, and passing that inert gas through the reformer to purge the reformer of residual hydrogen and carbon monoxide.

In another example, in addition to purging the reformer, the inert gas from the burner may also be passed through the anode flow field of the fuel cell to purge the anode flow field of residual hydrogen upon shut-down. The purging of the reformer and the anode flow field may be done with separate, parallel flows of the inert gas from the burner, or the inert gas may be passed in series, first through the reformer and thereafter through the anode flow field.

If the fuel processing system includes other catalytic fuel processing components, the inert gas from the burner may be passed in series through all of those components to purge the entire fuel processing system of residual hydrogen and carbon monoxide.

Once the purging is complete, the flow of organic fuel and air to the burner is halted. During continued shutdown, air eventually fills the volumes of the fuel processing system components as well as the anode and cathode flow fields. Upon start-up of the fuel cell, but before connecting the fuel cell to the load, air and organic fuel may again be directed into the burner to produce the aforementioned inert purge gas. That purge gas may then be directed through the anode flow field to purge it of air. Once such purging is complete, organic fuel flow to the inert gas generating burner is stopped, and organic fuel is fed directly into the fuel processing components to begin the conversion of that fuel to hydrogen. Reactants are then provided to the fuel cell and power production is commenced.

In the case where the fuel processing system includes a shift converter that uses a nickel or nickel alloy catalyst, care must be taken not to conduct the purging of that component at temperatures between about 90° C. to 200° C. Between those temperatures, nickel reacts with the carbon monoxide in the fuel-processing stream to form nickel carbonyl, which is volatile and toxic. Shift converters that use noble metal or noble metal alloy catalysts would not have this problem.

The foregoing features and advantages of the present invention will become more apparent in light of the following detailed description of exemplary embodiments thereof as illustrated in the accompanying drawings.

BRIEF DESCRIPTION OF THE DRAWINGS

The sole FIGURE shows a block diagram of a fuel cell system that may be operated according to the procedures of the present invention.

DETAILED DESCRIPTION OF THE INVENTION

The sole FIGURE schematically depicts a fuel cell system 100 that may be operated in accordance with the teachings of the present invention. The fuel cell system 100 includes a fuel cell 102, a fuel processing system 104, sources of air 106A and 106B (which may simply be ambient air), a source of organic fuel 108 (for example, natural gas or gasoline), a burner 110 (which may be, but is not necessarily, a catalytic burner), a heat exchanger 112, a source of steam 114, and blowers 116A, 116B, and 116C, for pumping air and other gases into and through various components of the system in a manner to be hereinafter described.

The fuel cell 102 comprises an anode electrode 118, a cathode electrode 120, and an electrolyte 122 disposed between the electrodes. The electrolyte may be in the form of a proton exchange membrane (PEM) of the type described in U.S. Pat. No. 6,024,848, or the electrolyte may be held within a ceramic matrix, such as is typically found in acid electrolyte fuel cells, such as phosphoric acid electrolyte fuel cells. The cell also includes an anode flow field plate 124 adjacent the anode electrode and a cathode flow field plate 126 adjacent the cathode electrode. The cathode flow field plate has a plurality of channels (not shown) extending thereacross adjacent the cathode electrode forming a cathode flow field for carrying an oxidant, such as air, across the cathode electrode. The anode flow field plate has a plurality of channels (not shown) extending thereacross adjacent the anode electrode forming an anode flow field for carrying a hydrogen containing fuel from the fuel processing system 104 across the anode electrode. An external circuit 128, including a primary load 130, is connected across the anode and cathode electrodes. A switch 132 in the circuit allows the fuel cell to be either connected or disconnected from the load.

Although only a single cell is shown, in actuality a fuel cell system 100 would include a plurality of adjacent cells (i.e. a stack of cells) connected electrically in series. For more detailed information regarding fuel cells like the one represented in the FIGURE, the reader is directed to commonly owned U.S. Pat. Nos. 5,503,944 (PEM cells) and 4,115,627 (phosphoric acid electrolyte cells), both of which are incorporated herein by reference.

In the fuel cell system 100, the components of the fuel processing system 104 include a desulfurizer 131, an autothermal reformer 134, a shift converter 136, and a selective oxidizer 138, the operation of which are well known in the fuel cell art. The desulfurizer does not need to be part of the fuel processing system in order to practice the present invention. It may be eliminated if the sulfur content of the organic fuel from the source 108 is sufficiently low.

In the autothermal reformer 134, fuel, air and steam are converted into hydrogen, carbon dioxide and carbon monoxide in a manner well known to those skilled in the art. Although an autothermal reactor is a preferred method for generating a hydrogen containing gas, other types of reactors may be used. For example, steam reformers, which are also well known in the art, react fuel and steam, in the presence of a catalyst, to produce an output gas of hydrogen, carbon dioxide, and carbon monoxide. Another example is a partial oxidation reformer that converts air and fuel to hydrogen, carbon monoxide and carbon dioxide by a catalytic process. Any of these or other well-known types of reformers may be used.

In the shift converter 136, the carbon monoxide concentration is reduced by reacting carbon monoxide with water, in the presence of a catalyst, to produce carbon dioxide and additional hydrogen.

The selective oxidizer 138 further reduces the carbon monoxide concentration by reacting the carbon monoxide with air in the presence of a catalyst, converting the carbon monoxide to carbon dioxide. The selective oxidizer does not need to be part of the fuel processing system in order to practice the present invention. If the carbon monoxide level of the shift converter output is sufficiently low, the selective oxidizer may be eliminated.

During normal fuel cell operation (i.e. the generation of power to a primary load), the switch 132 is closed, connecting the anode electrode 118 to the cathode electrode through the external circuit 128. A diverter valve 140 is fully closed. The valve 141 is open and the blower 116B is on, such that air from the source 106B is directed into the cathode gas space 126 via a conduit 142. The spent air leaves the fuel cell via the conduit 144. At the same time, a diverter valve 146 directs organic fuel from the source 108 only into the desulfurizer 131 of the fuel processing system 104 via a conduit 148. At this time, the valve 146 does not allow fuel to flow into the conduit 150 and burner 110; and a diverter valve 149 is fully closed.

The blower 116C is on and the valves 152, 154, and 156 are open. Thus, steam from the source 114, air from the source 106B, and the output from the desulfurizer enter and pass through the reformer 134. The output from the reformer is directed into and through the shift converter 136. The shift converter output combines with air from the conduit 153 and passes through the selective oxidizer 138. With the diverter valve 158 set to direct the entire output from the selective oxidizer through the anode flow field plate 124, the now fully processed fuel, containing a high percentage of hydrogen, passes over the anode electrode 118 and leaves the cell via the conduit 160. The oxidant on the cathode electrode and hydrogen on the anode electrode react to produce a current within the external circuit 128 to power the load 130.

In an exemplary embodiment of the present invention, a fuel cell system that is generating power is shutdown as follows: The switch 132 is opened to disconnect the fuel cell from the load 130. The valves 141, 152, 154, and 156 are closed and the blowers 116B and 116C are shut off. The diverter valve 158 is reset to vent the entire output from the fuel processing system 104 to atmosphere via a conduit 162. The diverter valve 146 is reset to shut off the flow of fresh organic fuel to the conduit 148, and to instead redirect that fuel into the burner 110, via the conduit 150. The diverter valves 149 and 140 are reset to fully open positions; and the blower 116A, which has been off during normal fuel cell operation, is turned on to deliver air from the source 106A into the burner 110.

The ratio of air and fuel fed into the burner 110 is selected to operate near stochiometric conditions such that the burner output gas is an "inert gas", as that term has been defined, above. Thus, burner output gas will contain essentially no oxygen. It may contain truly inert gases, such as nitrogen; or it may, for example, contain carbon dioxide and water vapor, which are harmless to fuel cells.

Further in accordance with the shut-down procedure of this embodiment, with the diverter valves 140 and 149 fully opened, a portion of the burner output gas (after having been cooled in the heat exchanger 112 to below about 200° C. so as not to overheat the fuel cells) flows into the desulfurizer via the conduit 164, while the balance flows through the valve 140. The valve 140 divides the flow between the conduits 166 and 168, such that a portion of the burner output gas passes in parallel through both the anode flow field and cathode flow field, purging both sides of the cell of reactants with an inert gas.

Simultaneously with purging the fuel cell, the burner output gas passes in series through the components of the fuel processing system, purging them of residual hydrogen and carbon monoxide. The purge gases from the fuel processing system are ultimately vented to atmosphere via the conduit 162. The volume of the burner output gas passing through the fuel processing system 104 must be sufficient to purge essentially all the hydrogen from the components. It will probably require a volume of purge gas at least three times the total volume of the fuel processing components being purged. Preferably, at least ten times the total volume of the fuel processing components should be used. Rather than controlling the purging by purge gas volume or by purge time, a sensor 170 may be placed in the vent conduit 162 to measure the hydrogen concentration or carbon monoxide concentration (or both). When the concentrations are sufficiently low or zero, the purging of the fuel processing components may be halted. Similarly, gas sensors 172 and 174 may be placed, respectively, in the cathode and anode flow field outlet conduits 144 and 160, to determine when purging of the fuel cell may be halted. Finally, a sensor, such as the sensor 176, may be placed in the burner outlet conduit 178 to monitor the composition of the burner output gas. The readings from the sensor 176 may be used to adjust the ratio of air and fuel fed to the burner to assure that a desired purge gas composition is maintained. When purging of the fuel cell system is determined to be complete, the valves 149, 146, and 158 are closed.

To start-up the fuel cell system after a period of shutdown, the valves 152, 154, and 158 are closed, and the air blowers 116B and 116C are off. The diverter valve 146 is set to feed fuel to only the burner 110; and simultaneously the air blower 116A is turned on to provide air to the burner 110. The diverter valves 149 and 140 are set to deliver the entire burner inert gas output through the anode flow field plate 124 via the conduit 168. This purging of the anode side of the fuel cell is continued until the oxygen content in conduit 160 is essentially zero. At that time, the air blower 116A is stopped and the fuel diverter valve 146 is reset to stop the flow of fuel into the burner 110. Also, the diverter valves 140 and 149 are closed.

Continuing the start-up procedure, superheated steam from the source 114 is passed into the reformer 134 and shift converter 136 to pre-heat them to approximately 250° C. The fuel diverter valve is positioned to feed fuel to only the desulfurizer via the conduit 148. Simultaneously, the valves 152 and 154 are opened and the air blower 116C is turned on. The fuel processing system now commences generation of a hydrogen rich fuel.

The diverter valve 158 is now opened providing fuel to the anode 118; and the air blower 116B is turned and the valve 141 is opened providing air to the cathode 120. The switch 132 is closed commencing power generation.

In the preceding exemplary embodiment, during the shut-down procedure the purge gas from the burner 110 is directed in parallel through the fuel processing system, the anode flow field, and cathode flow field. In an alternate embodiment, burner output gas may be passed in series through the fuel processing components and then through the anode flow field. Furthermore, it is not critical that the fuel processing system include all the components shown in the FIGURE. For example, the fuel processing system might only have a reformer and shift converter.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. In a procedure for shutting down a fuel cell system that is delivering power to a primary load, the system comprising a fuel cell having an anode electrode, a cathode electrode, and an electrolyte disposed therebetween, said cell also including an anode flow field for carrying a hydrogen containing fuel through the cell over the anode electrode and a cathode flow field for carrying an oxygen containing gas through the cell over the cathode electrode, the fuel cell system also including a source of organic fuel, a fuel processing system to convert the organic fuel to hydrogen, and a burner, the fuel processing system comprising a plurality of fuel processing components including a reformer upstream of and in series with a shift converter, the steps of:

a. disconnecting the primary load from the cell and halting the processing of organic fuel within the fuel processing system to produce hydrogen;

b. after step (a), directing air and organic fuel from the source into the burner in a ratio selected to result in burner combustion products consisting of inert gases; and c. passing at least a portion of the burner combustion products of step (b) through at least the reformer of the fuel processing system at least until the reformer has been purged of residual hydrogen and carbon monoxide.

2. The procedure according to claim 1, wherein step (c) also includes passing a portion of the burner combustion products of step (b) through at least one of the fuel cell glow fields in parallel with the flow of burner combustion products passed through the reformer to purge such at least one flow field of reactant gases.

3. The procedure according to claim 2, wherein in step (c) a portion of the burner combustion products of step (b) is passed in parallel through the reformer, the cathode flow field, and the anode flow field, to purge the reformer of residual hydrogen and carbon monoxide and to purge the cathode and anode flow fields of reactants.

4. The procedure according to claim 1, wherein the burner combustion products of step (b) consist essentially of nitrogen, carbon dioxide, and water vapor.

5. The procedure according to claim 1, wherein in step (c) the combustion products of step (b) are passed, in series, through the reformer and then through the anode flow field to purge both the reformer and the anode flow field of residual hydrogen.

6. The procedure according to claim 1, wherein in step (c) the burner combustion products of step (b) are passed in series through the reformer and the shift converter to purge the reformer and shift converter of residual hydrogen and carbon monoxide.

7. The procedure according to claim 1, wherein in step (c) the burner combustion products of step (b) are passed in series through all the fuel processing components of the fuel cell system to purge all the components of residual hydrogen and carbon monoxide.

8. The procedure according to claim 1, wherein the burner combustion products of step (b) are passed in series through all the fuel processing components of the fuel cell system and from the fuel processing components through the anode flow field to purge the fuel processing components and the anode flow field of residual hydrogen and carbon monoxide.

9. The procedure according to claim 7, wherein the fuel processing components include a desulfurizer, upstream of and in series with the reformer, and a selective oxidizer downstream of and in series with the shift converter.

10. The procedure according to claim 4, wherein the shift converter uses a nickel or nickel alloy containing catalyst, and the temperature of the gases from the reformer entering the shift converter during purging is maintained above 200° C.

11. The procedure according to claim 2, followed by a procedure for starting up the fuel cell system comprising the following steps in the following order:

a. directing organic fuel and air into the burner in a ratio selected to result in combustion products consisting of inert gases;

b. passing the resulting inert gases through the anode flow field at least until the oxygen content of the gases leaving the anode flow field is essentially zero;

c. stopping the flow of inert gases through the anode flow field;

d. directing organic fuel into the reformer to produce a hydrogen containing gas;

e. directing the hydrogen containing gas from the reformer into the shift converter;

f. directing the hydrogen containing processed fuel from the fuel processing system through the anode flow field and directing air through the cathode flow field; and g. connecting the primary load across the fuel cell.

\* \* \* \* \*